US005265842A

United States Patent [19]

Sorah et al.

[11] Patent Number: 5,265,842

[45] Date of Patent: Nov. 30, 1993

[54] EMISSION CONTROL METERING VALVE

[75] Inventors: Gary V. Sorah, Delphi; John E. Troxler, Logansport, both of Ind.

[73] Assignee: Federal-Mogul Corporation, Southfield, Mich.

[21] Appl. No.: 955,073

[22] Filed: Oct. 1, 1992

[51] Int. Cl.[5] ........................ F16K 31/06; F16K 31/10

[52] U.S. Cl. ........................... 251/129.08; 251/129.01; 251/65; 251/905; 251/129.05; 137/901

[58] Field of Search ....................... 251/129.01, 129.15, 251/129.08, 905, 129.14, 129.05; 137/901

[56] References Cited

U.S. PATENT DOCUMENTS 1,342,641 6/1920 Moreton .
1,819,452 8/1931 Wright ............................ 137/901 X
2,229,499 1/1941 Fisette .
2,296,132 9/1942 Wiseley .
2,792,195 5/1957 Mosbacher .
3,506,030 4/1970 Vesco ......................... 251/129.14 X
3,683,597 8/1972 Beveridge et al. .
3,774,504 11/1973 Bonney .
3,778,024 12/1973 Rogerson .
4,044,743 8/1977 Eaton .
4,475,522 10/1984 Oonaka .
4,702,216 10/1987 Haruta et al. .
4,703,737 11/1987 Cook et al. .
4,763,635 8/1988 Ballhause et al. .
4,819,607 4/1989 Aubel .
4,848,725 7/1989 Tibbals, Jr. ................ 251/129.01 X
4,894,072 1/1990 Turner et al. .
4,901,702 2/1990 Beicht et al. .
4,944,276 7/1990 House et al. .
4,953,514 9/1990 Beicht et al. .
5,012,838 5/1991 Kawase et al. .
5,069,188 12/1991 Cook .
5,076,537 12/1991 Mears, Jr. ............................. 251/65
5,094,218 3/1992 Everingham et al. ..... 251/129.08 X

FOREIGN PATENT DOCUMENTS 0000677 1/1983 Japan .................................. 251/905

*Primary Examiner*—Arnold Rosenthal
*Attorney, Agent, or Firm*—Lawrence J. Shurupoff

[57] ABSTRACT

An engine emission control metering valve includes a metering ball valve element operatively connected to an electrically-energized linear actuator that includes a stationary magnet and a moving coil concentric with the magnet. The coil has a different axial length than the magnet such that application of a current to the coil causes coil-generated magnetic flux to axially push the coil away from the magnet. Coil movement translates into movement of the metering valve element through the wedging action of a cam element driven by the coil movement.

11 Claims, 1 Drawing Sheet

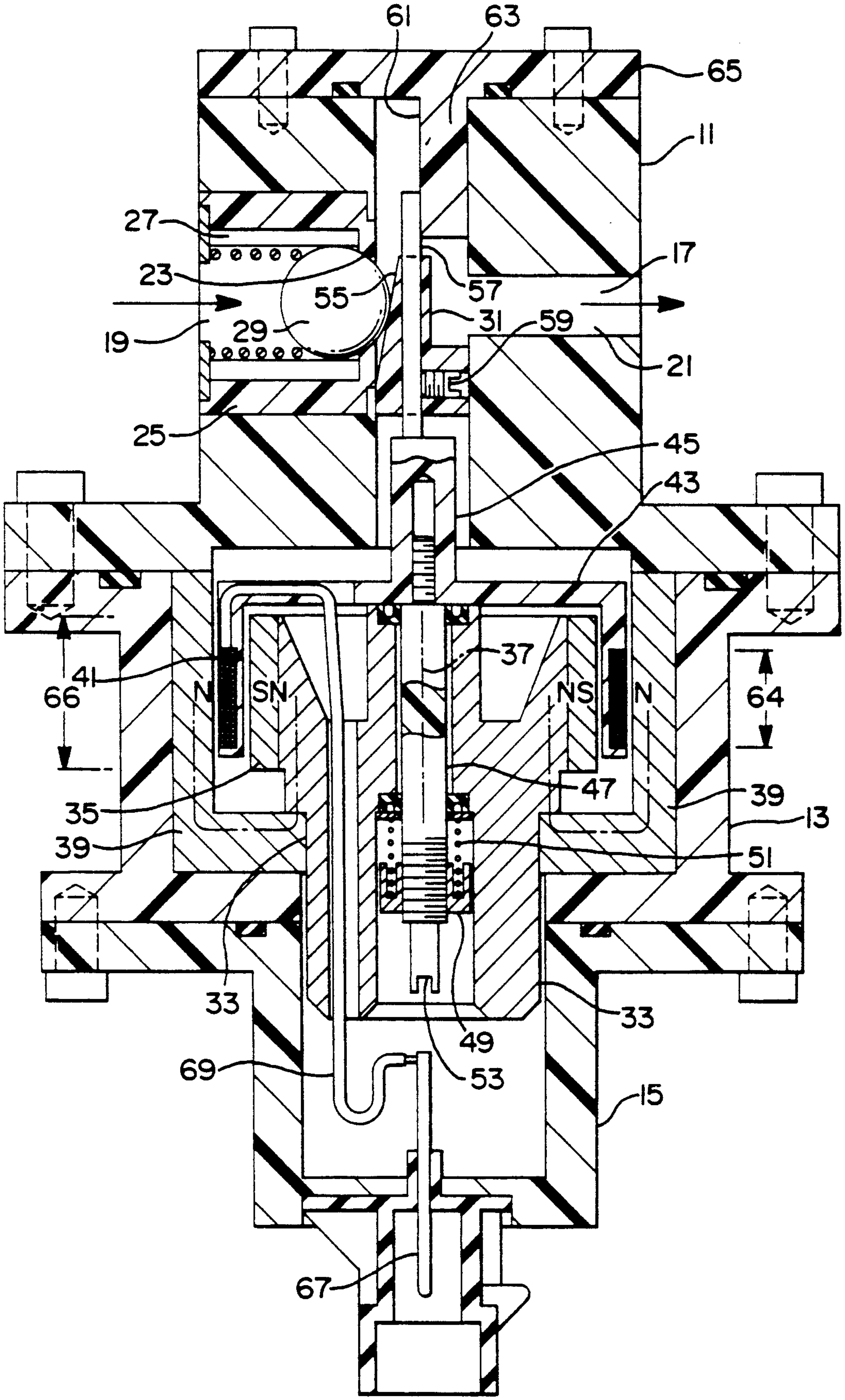
61
63
65
11
27
17
23
57
55
19
29
31
59
21
25
45
43
41
37
66
N
SN
NS
N
64
35
47
39
39
13
51
33
33
49
69
53
15
67

EMISSION CONTROL METERING VALVE

BACKGROUND OF THE INVENTION

1. Field of the Invention

This invention relates to emission control systems for automotive engines, and particularly to a metering valve adapted for use in such emission control systems.

2. Description of Prior Developments

Various emission control systems have been devised for controlling the escape of fuel vapors from vehicle fuel tanks. One such system shown in U.S. Pat. No. 3,683,597 includes a canister containing activated charcoal. The canister has lines leading to the vehicle fuel tank and to the engine induction system so that, during operation of the engine, fuel vapors collected in the canister are drawn into the engine for combustion in the engine cylinders.

U.S. Pat. No. 4,475,522 shows an engine emission control system that includes a solenoid valve between a vapor collection canister and the engine intake system. The flow of fuel vapor to the engine can be controlled by selective energization of the valve solenoid.

U.S. Pat. No. 4,703,737 shows an emission control system that includes a solenoid valve having two oppositely moving armature plungers, such that one of the plungers controls vapor flow from the fuel tank to a charcoal canister, while the other plunger controls vapor flow from the canister to the engine intake manifold.

U.S. Pat. No. 4,944,276 shows an engine emission control system wherein a solenoid valve is arranged in series flow relation with a pressure-responsive diaphragm valve so that the diaphragm valve partially regulates the vapor flow rate to the engine when the solenoid valve is in an open condition.

U.S. Pat. No. 5,069,188 shows another engine emission control system that includes a diaphragm flow regulator means in association with a solenoid valve. In this case, the diaphragm operator has a port formed therein for recirculating fuel vapor back to the solenoid valve under certain operating conditions.

SUMMARY OF THE INVENTION

The present invention relates to a metering valve adapted for use between a vapor collection canister and an engine intake manifold to allow collected vapor to be returned to the engine at a variably controlled rate. The metering valve may be operated in a pulsed fashion such as by pulse width modulation or by a continuous variable D.C. current provided by an electronic control unit that functions in response to various engine operating parameters, including engine speed.

In a preferred form of the invention, the metering valve includes a vapor flow metering element operatively connected to an electrically energized linear actuator. The actuator includes a stationary, radially-magnetized permanent magnet attached to a stationary armature and to a stationary flux path element. A moving electric coil is concentrically mounted around the magnet within an air gap defined between the permanent magnet and an annular flux ring. Current flow in the coil is perpendicular to the lines of flux produced by the permanent magnet in the air gap. This interaction between magnetic flux and current flow produces a force in the axial direction as is generally understood in the art.

The axial length of the coil is preferably smaller than that of the magnet and restricted so that the coil is always positioned between and axially co-extensive with the magnet and the flux path element throughout the stroke of the coil. For a fixed current, the axial force of the actuator is fixed or constant regardless of the position of the coil because the same amount of magnetic flux from the permanent magnet passes through the coil during its movement. This magnetic interaction provides for a basically linear relationship between the magnitude of the current applied to the coil and the axial movement of the coil. Such a relationship is particularly desirable for use with a microprocessor type engine control unit.

An alternate arrangement is possible wherein the axial length of the permanent magnet is less than the axial length of the coil so that the coil completely axially overlaps the magnet throughout the stroke of the coil. This provides a similar linearity between current applied to the coil and actuation force and movement as discussed with respect to the previous example.

A spring is operatively engaged with the moving coil to bias it in a direction opposite to the axial force produced by the actuator. The metering valve is connected to the coil so that, when the coil is in its de-energized state, the valve is in a closed or no-flow condition. Energization of the coil generates an axial force that tends to push the coil in an axial direction so as to compress the spring and unseat a valve element such as a ball seated in a ball valve seat. The coil can take various positions, depending on the magnitude or frequency of the current applied to the coil.

In a preferred arrangement, the current is applied to the coil in pulse fashion such that the position of the coil and associated metering valve is related to the duty cycle. The current pulses are supplied to the coil by an electronic control unit, not part of the present invention.

BRIEF DESCRIPTION OF THE DRAWINGS

In the drawing:

The single FIGURE is a sectional view taken through a metering valve embodying features of the invention.

DETAILED DESCRIPTION OF THE PREFERRED EMBODIMENTS

Referring to the drawing, there is shown a metering valve that includes a housing formed by three connected housing sections 11, 13 and 15. Housing section 11 forms a vapor flow passage 17 that includes an inlet chamber 19, outlet chamber 21 and annular valve seat 23. Vapor flow is in a left-to-right direction, as indicated by the arrows.

The metering valve will be connected to an evaporative emission control system of an automotive engine so that inlet chamber 19 is in communication with a charcoal canister of the system, and outlet chamber 21 is in communication with the engine intake manifold. When the engine is running, fuel vapors will be drawn through the metering valve in a left-to-right direction.

Valve seat 23 is formed by an inturned flange formed on an annular insert element 25. Three or more ribs 27 are formed on the inner surface of the insert element for guidance of a ball-shaped valve element 29. As shown in the drawing, the valve element is in a closed position seated against valve seat 23 under the light biasing force of spring 24. The valve element is in a floating condition, such that it can be deflected leftwardly away from the valve seat by upward motion of a cam operator 31.

Cam operator 31 constitutes part of an electrically energizable linear actuator that is utilized to controllably move ball valve element 29 incremental distances away from valve seat 23 so that the valve element meters the vapor flow as a function of the electrical input to the linear actuator.

The illustrated linear actuator includes an annular ring-like permanent magnet 35 carried on a ferro-magnetic support element or flux path element 33 such that permanent magnet 35 is concentric around a central axis 37. The flux path element 33 serves as a stationary armature. Magnet 35 is radially magnetized so that its poles are radially oriented as shown in the drawing. The resulting magnetic path through the magnet 35, flux path element 33 and flux ring 39 is represented by the dotted lines in the drawing FIGURE.

Spaced radially outboard from magnet 35 is a magnetic flux ring 39 suitably supported in housing section 13. The annular space between magnet 35 and flux ring 39 is occupied by a movable electrical coil or winding 41 that is mounted to and depends from a non-magnetic radial wall 43 formed of brass, plastic, aluminum or other suitable non-magnetic material.

Radial wall 43 is clamped to central shaft 47 via a central post 45 that has a threaded bore designed to receive the threaded end of central shaft 47. The shaft 47 is thus rigidly connected to wall 43 and coil 41. The central post 45, with attached cam element 31 is axially slidable along with radial wall 43 and shaft 47 as the energized coil drives these members axially with respect to fixed flux path element 33 and fixed flux ring 39.

A lower section of the shaft 47 is threaded to adjustably receive a nut 49 that acts as a retainer for a coil spring 51. Spring 51 exerts a downward force on nut 49 and shaft 47 so that the associated radial wall 43 and electrical coil 41 are biased in a downward direction to the position shown in the drawing. The effective force of spring 51 can be varied by screwing nut 49 upwardly or downwardly on shaft 47. The extreme lower end of the shaft has a screwdriver slot 53 to facilitate initial connection of the shaft to hollow post 45.

Cam operator 31 includes a cam element having a flat cam surface 55 acutely angled to the axis 37 of shaft 47 at an angle of about twelve degrees. With such an angulation, a given upward axial motion of the ramp-shaped cam element will produce a relatively slight horizontal, radial or transverse motion of ball valve element 29.

This ramping or wedging action between the cam element and ball provides a significant mechanical advantage allowing a small axial force to produce a larger radial force for unseating ball 29. This in turn allows for a smaller, lighter and more efficient actuator. Of course, the cam element may be formed with any desired ball contacting profile so as to produce virtually any desired relationship between flow through the valve and current applied to the coil. However, the illustrated embodiment provides for a linear relationship.

Cam operator 31 is preferably adjustably positioned on a stem 57 that projects axially upwardly from post 45. A set screw 59 can be used to clamp the cam operator in a desired position of adjustment, such that upward motion of the cam operator produces an instant corresponding motion of the ball valve element without any play or lag in response. Stem 57 and the associated mounting hole in cam operator 31 can have mating half-round cross sections to prevent any inadvertent rotation of the cam operator on the stem. The flat surface of stem 57 is slidably engaged on a flat guide surface 61 on a tongue 63 that projects downwardly from an overlying cap 65, such that stem 57 is prevented from deflecting under the transverse loading of ball 29.

The axial length of electrical coil 41 is denoted by numeral 64. The axial length of magnet 35 is denoted by numeral 66. As will be seen, the coil length dimension is considerably less than the magnet length dimension. Also, in its illustrated position, the coil is offset downwardly from an axially centered position wherein its opposite ends would be equidistant from the corresponding ends of the magnet.

When coil 41 is electrically energized, the magnetic flux generated by magnet 35 tends to axially push coil 41 away from magnet 35. Such action is resisted by coil spring 51 and by the loading of ball 29 against cam element 31. In this connection, it should be noted that the vapor in flow passage 17 is at a negative pressure due to the negative pressure condition in the engine intake manifold. Ball 29 is thus further biased against the cam element 31 to present a loading force opposing upward movement of coil 41.

The instantaneous position of coil 41 is determined by the magnitude or frequency of the current applied to the coil. In the illustrated valve, the current is supplied to conventional pin terminals 67 that are connected to flexible lead wiring 69. As shown, the flexible lead wiring extends upwardly through a clearance hole in support element 33 and then along a groove formed in radial wall 43. Only one lead wire is visible in the drawing. However, it will be appreciated that in practice there are two lead wires and two associated pin terminals.

In preferred practice of the invention, the current is supplied to the pin terminals 67 in the form of time-spaced or pulse width modulated pulses. A conventional electronic control unit, not shown, varies the pulse frequency and duty cycle of the current as a function of engine speed and other operating parameters, such that direct current pulses of varying frequency or varying pulse width are supplied to terminals 67.

As each current pulse is applied to coil 41, a magnetic flux is generated for exerting an upward lift or push force on the coil and associated cam element 31. As the electrical pulse ceases, the magnetic flux diminishes so that the coil tends to return to its illustrated position as a response to the force of spring 51 and the pressure of ball 29 on cam element 31. The equilibrium or mean position of coil 41 is determined by the applied duty cycle. The larger the duty cycle, the higher will be the equilibrium position of the coil and associated cam element 31.

By varying the duty cycle of the applied current pulses to coil 41, it is possible to effectively vary the spacing of ball 29 from the associated valve seat 23 so as to adjustably meter the vapor flow through passage 17. In a typical situation, the current pulse width would usually be small at low engine speeds and large at high engine speeds. The corresponding vapor flow rate would vary accordingly in a generally linear fashion. The coil, in an alternate arrangement, can be energized by a steady state D.C. current of varying intensity to achieve the desired flow metering action.

In a typical construction wherein ball valve element 29 has a diameter of about 0.45 inch, the stroke distance of coil 41 and cam element 31 might be about 0.3 inch. The corresponding motion of ball element 29 produced by the coil movement would be about 0.06 inch. The ball element would be spaced from valve seat 23 a variable distance within the 0.06 inch range, depending on the duty cycle of the current applied to coil 41.

As noted previously, the invention provides a metering valve that includes a linear actuator having a moving coil and stationary magnet. The coil has a lesser length than the armature so that, when the coil is energized, the coil is axially repulsed and moved away from the magnet. A ball valve element is operatively connected to the moving coil to exert a metering action on the vapor flow in accordance with the magnitude of the current applied to the moving coil.

The drawings necessarily show specific structures and component configurations useful in practice of the invention. However, it will be appreciated that the invention can be practiced in various forms.

What is claimed is:

1. A metering valve, comprising:

a valve housing having a vapor flow passage that includes an inlet chamber, an outlet chamber, and a valve seat therebetween;

a valve element located in said inlet chamber for movements toward and away from said valve seat to control the flow of vapor through said vapor flow passage;

an electrically-energizable linear actuator operatively connected to said valve element for moving said valve element to meter the vapor flow;

said linear actuator comprising a radially magnetized permanent magnet having a central axis and axially spaced opposite end portions for producing a predetermined magnetic flux, an annular coil concentrically disposed with respect to said central axis, said coil having axially spaced opposite end portions spaced apart an axial distance different than the corresponding axial spacing of the permanent magnet opposite end portions such that passage of said magnetic flux through said coil is substantially constant throughout movement of said actuator;

spring means axially biasing said coil; and said vapor flow passage comprising an axis extending transverse to said central axis and said linear actuator comprising a cam element movable along said central axis to exert a cam operating force on said valve element.

2. The metering valve of claim 1, wherein said valve element is a ball.

3. The metering valve of claim 1, wherein said valve element is a ball having a diameter greater than the diameter of said valve seat, whereby a segmental portion of the ball projects through said seat into said outlet chamber.

4. The metering valve of claim 3, wherein said cam element is engaged with said projecting portion of the ball.

5. The metering valve of claim 1, wherein said spring means is oriented to bias said coil in a direction wherein the valve element is seated against said valve seat.

6. The metering valve of claim 1, wherein said linear actuator comprises a central shaft located on the central axis of said magnet; said coil having a fixed connection with said shaft, whereby the shaft and coil are movable as a unit along the shaft axis; and said spring means comprising a coil spring surrounding said shaft.

7. The metering valve of claim 6, wherein said vapor flow passage has an axis extending transverse to the axis of said shaft; said valve element comprising a ball having a diameter greater than the diameter of said valve seat, whereby a segmental portion of the ball projects through said seat into said outlet chamber; said linear actuator comprising a cam element mounted on said shaft to exert a cam operating force on said projecting portion of the ball.

8. The metering valve of claim 7, wherein said cam element comprises a cam surface acutely angled to the shaft axis so that the stroke distance of the cam element is appreciably greater than the stroke distance of the ball.

9. The metering valve of claim 1, wherein said coil has a greater diameter than said magnet, whereby the magnet is located within the space circumscribed by the coil.

10. The metering valve of claim 9, and further comprising a magnetic flux ring surrounding the coil, such that magnetic flux generated by the coil flows partly through the magnet and partly through the flux ring.

11. A metering valve, comprising:

a valve housing having a vapor flow passage that includes an inlet chamber, an outlet chamber, and a valve seat therebetween;

a valve element located in said inlet chamber for movements toward and away from said valve seat to control vapor flow through said vapor flow passage;

an electrically-energizable linear actuator operatively connected to said valve element for moving said valve element to meter the vapor flow;

said linear actuator comprising a radially magnetized permanent magnet having a central axis and producing a predetermined magnetic flux, an annular coil concentrically disposed with respect to said central axis, and spring means axially biasing said coil; and said vapor flow passage comprising an axis extending transverse to said central axis and said linear actuator comprising a cam element movable along said central axis to exert a cam operating force on said valve element.

* * * * *